United States Patent [19]
Collins

[11] Patent Number: 5,531,645
[45] Date of Patent: Jul. 2, 1996

[54] AMUSEMENT RIDE

[76] Inventor: Laurence H. Collins, 4 Enterprise Rd., Mablethorpe, United Kingdom

[21] Appl. No.: 380,352

[22] Filed: Jan. 30, 1995

[51] Int. Cl.$^6$ .................................................. A63G 13/06
[52] U.S. Cl. ................. 472/97; 472/95; 354/290
[58] Field of Search .................... 472/95, 96, 97, 472/98, 29, 6; 354/290, 291, 80

[56] References Cited

U.S. PATENT DOCUMENTS

| | | | |
|---|---|---|---|
| 2,908,500 | 10/1959 | Yetter | 472/97 |
| 3,149,837 | 9/1964 | Kramm | 472/97 |
| 4,289,307 | 9/1981 | Marshall, Jr. et al. | 472/98 |
| 5,072,246 | 12/1991 | Thayer et al. | 354/290 X |
| 5,074,820 | 12/1991 | Nakayama | 472/98 X |

FOREIGN PATENT DOCUMENTS 2179561A 11/1985 United Kingdom.

*Primary Examiner*—Kien T. Nguyen
*Attorney, Agent, or Firm*—Watov & Kipnes

[57] ABSTRACT

A coin or token-operated amusement ride comprises a base having a drive unit therein and one or more driven arms extending therefrom and supporting a ride seat which is moved cyclically for a period of ride operation by the drive unit upon actuation by payment of one or more coins or other tokens into the ride, wherein there is further provided a camera unit mounted on the ride and directed toward the ride occupant/user and adapted to be triggered during operation of the ride to take a photograph of the ride occupant. A printer may deliver the finished print to the ride occupant as the ride operation ends.

17 Claims, 8 Drawing Sheets

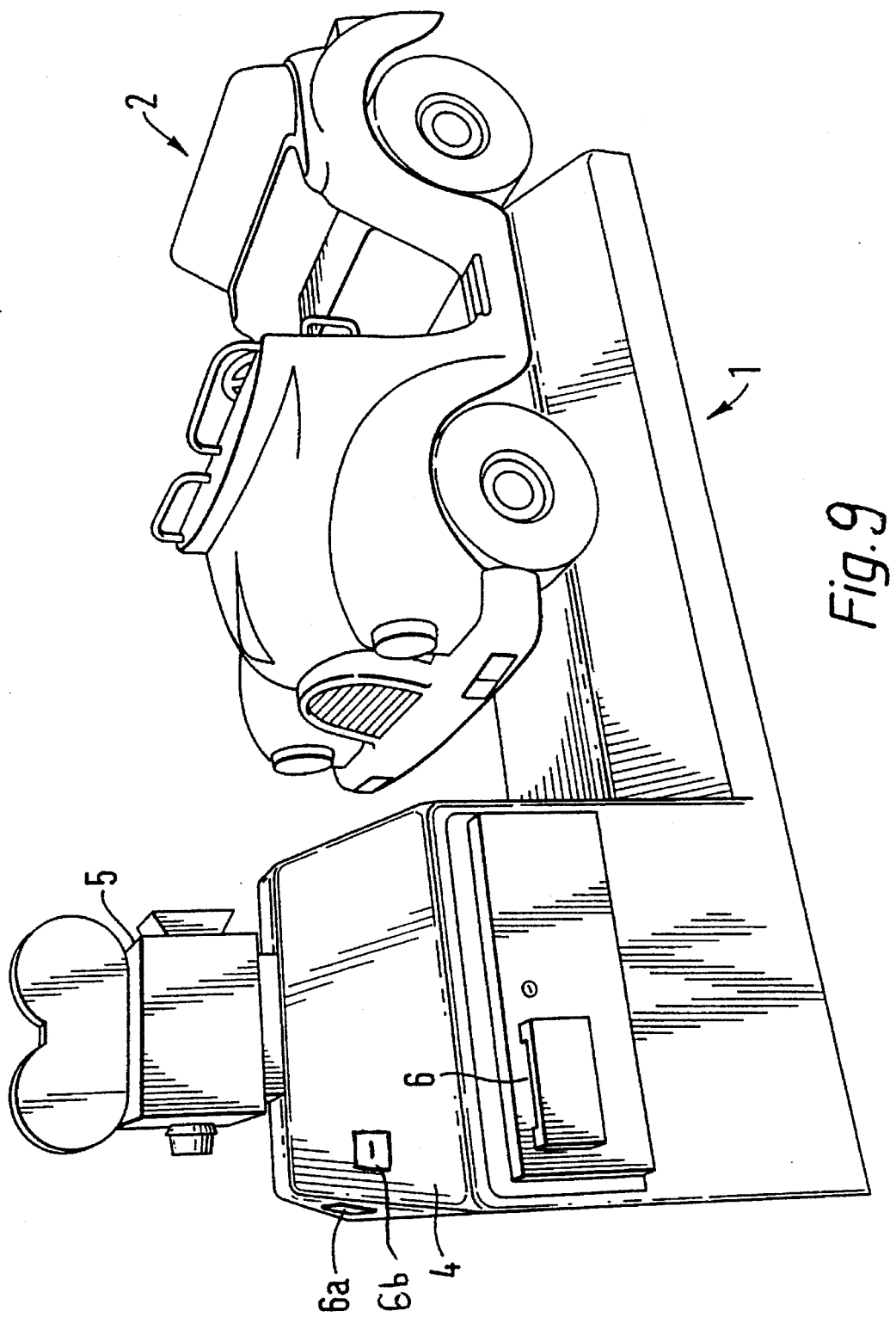

5,531,645

AMUSEMENT RIDE

FIELD OF THE INVENTION

The present invention relates to an amusement ride, for example of the type in which a child sits on or in a seat which is then moved cyclically for a predetermined period in response to receipt by the ride of a payment. Such rides are typically referred to as "kiddie rides".

BACKGROUND TO THE INVENTION

Coin-operated amusement rides are a familiar feature of many shopping precincts and amusement arcades throughout the United Kingdom and elsewhere in the world. The rides are generally compact electrically-powered devices comprising a base drive unit having a driven support arm extending upwardly therefrom and supporting a moulding of a suitable, generally fanciful, design, for example of a cartoon animal, a transport vehicle or other figure, and having a seat mounted thereon or formed integrally therewith. The support arm is generally arranged to oscillate to provide the seat with a cyclical fore-and-aft and/or up-and-down and/or side-to-side motion once the ride has been initiated by inserting the requisite number of coins or tokens into a pay box.

A recent development of the kiddie ride provides the user with a present, or "prize", as a further inducement to use the ride and/or as a memento, or as a method of vending articles such as toys in a novel way. In such systems the ride generally dispenses the present at the start or finish of the ride's session. Such a system is disclosed in GB-A-2 179 56 1.

As a memento of the ride, however, a novelty present has no special significance. It would be more desirable to provide a record of the experience.

SUMMARY OF THE INVENTION

According to the present invention there is provided an amusement ride comprising a base including drive means, a seat mounted on the base and movable relative thereto by the drive means, first payment means for causing operation of the drive means in response to receipt of a payment, photographic means attached to the base and arranged to produce a photograph of the seat and any occupant thereof, and control means operatively connected to the drive means and to the photographic means to enable operation of the photographic means when the drive means is operating.

Preferably the control means comprises timing means to cause the photographic means to operate automatically to produce a photograph after a predetermined period of operation of the drive means. Triggering of the photographic means to produce the photograph takes place as a result of operation of the drive means in response to receipt of payment, which may be by way of coins, tokens, notes, or magnetic or electronic payments cards or the like. The ride may incorporate synchronising means to ensure that the seat and its occupant are in a predetermined position relative to the photographic means to ensure that the best picture is achieved from the point of view of focus, lighting, movement of the subject and composition.

The ride may comprise means for generating a warning signal at a predetermined time interval before operation of the photographic means. The means for generating a warning signal preferably comprises speech synthesis means for producing a speech message. A visible signal, such as a warning light or sign, may be produced as well or instead.

In an alternative embodiment of the invention, a second payment means is associated with the photographic means and arranged to cause operation of the photographic means in response to receipt of a payment therein. The second payment means may be a coin-release mechanism of the "lock-out" type, which requires a voltage signal to release it. The voltage signal can be provided by the power to the drive means, so that the mechanism can only be operated while the ride is operating. Alternatively, an electronic coin mechanism can be used, the mechanism only being powered while the drive is powered.

In yet another embodiment, the first payment means comprises an electronic coin-release mechanism arranged to provide two alternative control signals according to the value of the money or tokens inserted. For example, a first, lower, payment causes the mechanism to output a first control signal which in turn causes the control means to operate the drive means alone, while a second, higher, payment causes the mechanism to output a second control signal which in turn causes the control means to operate the drive means and the photographic means in the required sequence.

Preferably, the photographic means comprises a video camera outputting a succession of video frames representing photographic images, and printing means for capturing one of the frames and for producing a photographic print of the image represented by the frame. The printing means may be a video printer, for example of the type producing a monochrome image thermally or a colour image by a dye-sublimation process or the like. The operation of the printing means may be initiated by a timing signal from the control means, by a user-operated press-button, or by the second payment means, when fitted.

Alternatively, the photographic means may comprise a camera provided with photochemical imaging means operable to produce a photographic print during the operation of the drive means or within a predetermined period following the end of operation of the drive means. An example of a suitable photochemical imaging means is the "instant" film pack sold by Polaroid Corporation, although it would also be possible to use a more conventional film processing and printing system, for example of the type used in photographic booths and the like.

BRIEF DESCRIPTION OF THE DRAWINGS

The invention will now be more particularly described by way of example with reference to, the drawings, in which:

FIG. 9 is a view corresponding to that of FIG. 1, showing an alternative embodiment having two coin-slots.

DETAILED DESCRIPTION OF THE ILLUSTRATED EMBODIMENTS

Figure 1:
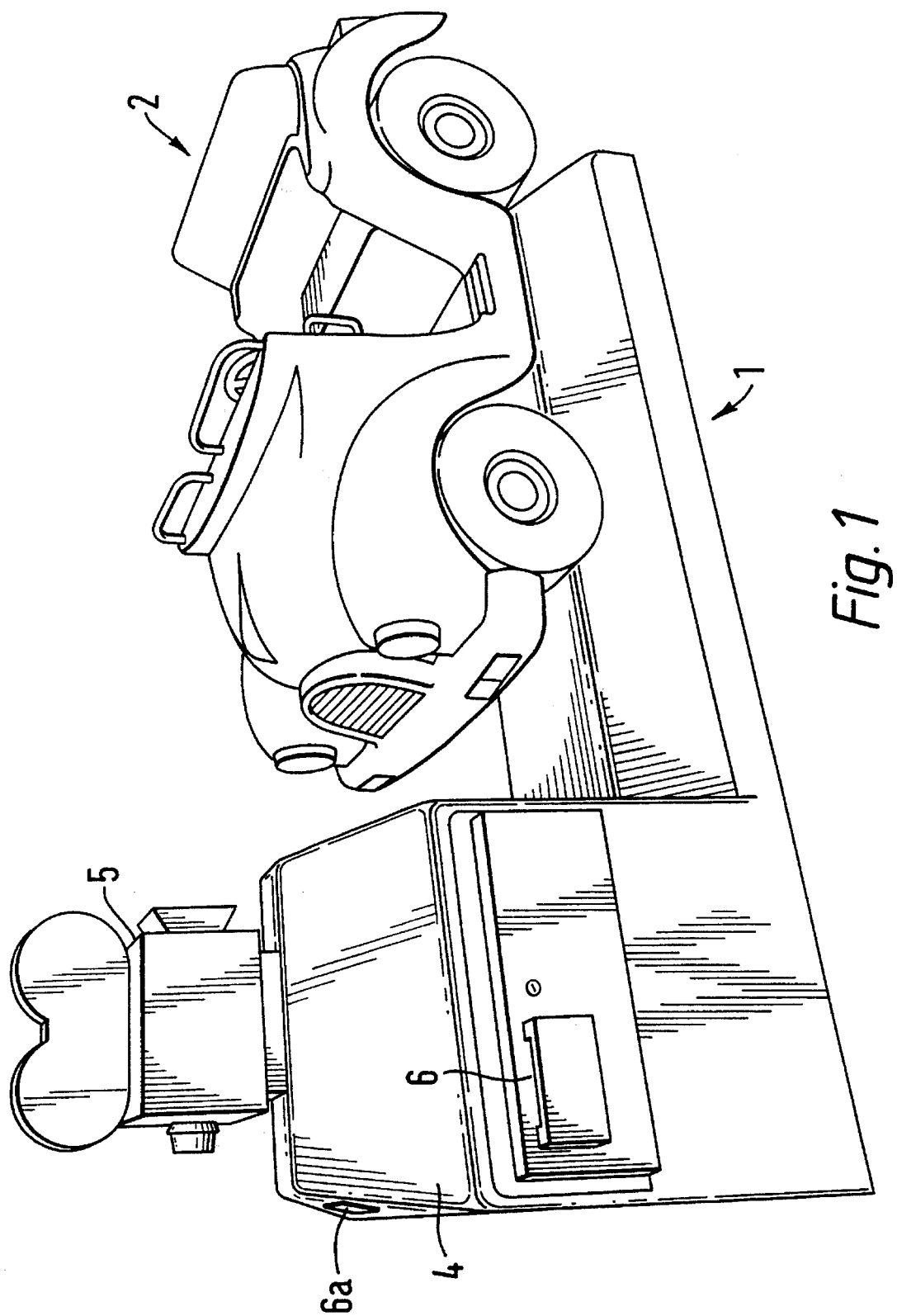
FIG. 1 is a perspective view of a coin operated amusement ride in accordance with a preferred embodiment of the invention.

Referring to FIG. 1, the ride comprises a base 1 containing a drive motor and control means as hereinafter described with reference to FIG. 2. A seat unit 2, in the form of a toy car, is mounted on drive arms 3 (FIG. 2) so as to be movable relative to the base. It will be appreciated that, while the seat unit is illustrated in the form of a toy car, it can have any other form, such as other vehicles and animals. The base 2 includes at one end thereof a control cabinet 4 mounting a video camera 5 directed toward the seat unit 2. The camera is suitably mounted within a protective casing, which can be shaped to simulate the appearance of an old movie camera or the like for decorative purposes. The cabinet 4 has at one side a delivery slot 6 for finished photographs and at the end a coin-slot 6a to operate the ride.

Figure 2:
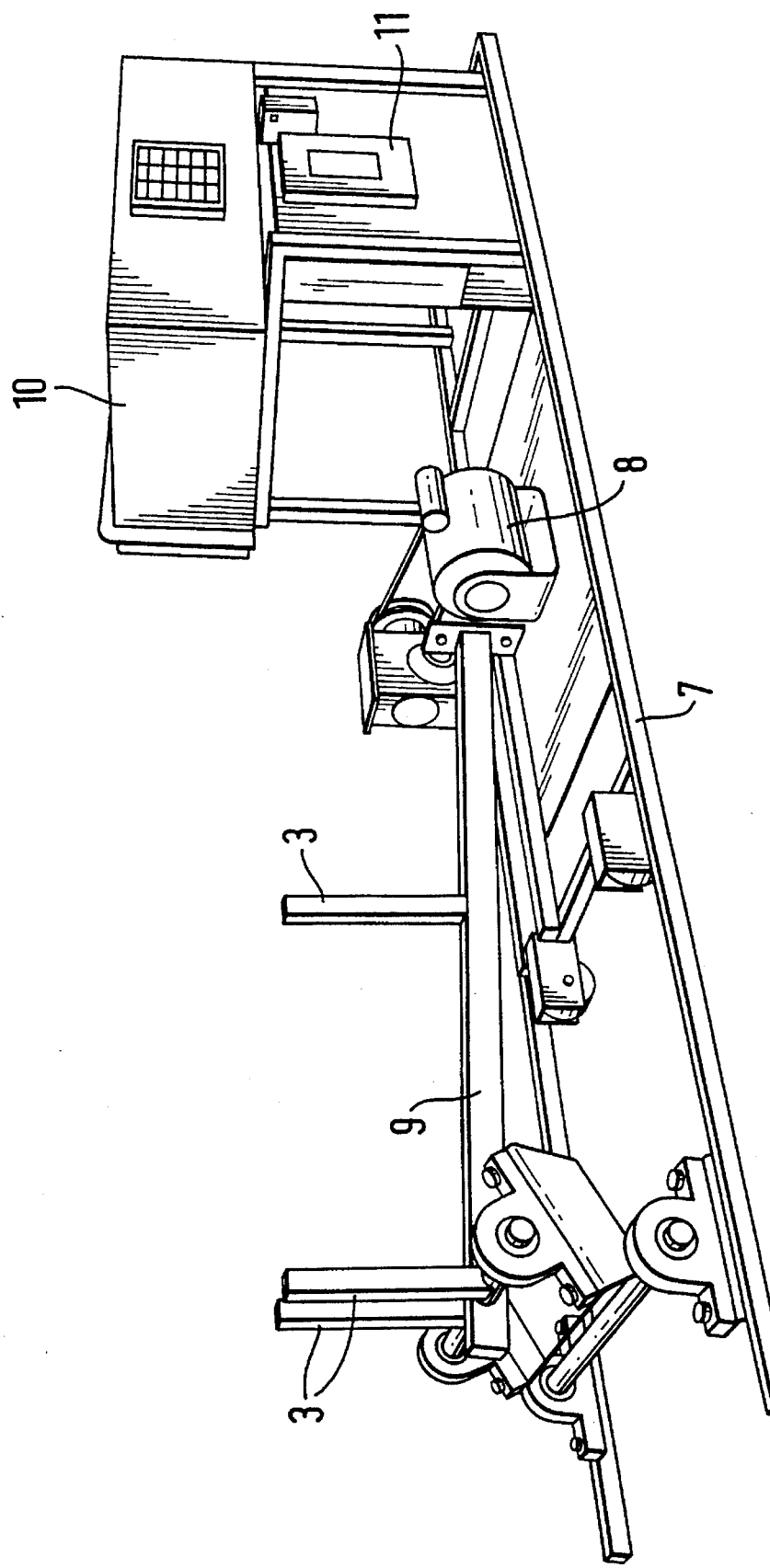
FIG. 2 is a perspective view from the rear of the ride illustrated in FIG. 1, with the casing removed.

Referring now to FIG. 2, the base 2 has a support frame 7 on which is mounted an electric motor 8 driving a reciprocating beam 9 which in turn carries the drive arms 3 on which the seat unit 2 is mounted. The reciprocating beam 9 imparts to the seat unit 2 an up-and-down and forward-and-backward motion. The cabinet 4 includes within it a video printer 10 connected to the video camera 5 and arranged to capture a video frame from the camera in response to a control signal and to print the frame as a photograph to be output to the delivery slot. The video camera may be a monochrome camera, for example a Sony SSC M350 CE monochrome video camera, the video printer then being, for example, a thermal printer forming a monochrome image on heat-sensitive paper. Alternatively, the video camera 5 may be a colour camera, for example a Mitsubishi CCD-200 colour video camera, and the printer is then a colour printer, for example of the dye-sublimation type, such as that sold by the Sony Corporation under their designation UP 1200 EPM. Such printers are capable of producing a full-colour finished photograph within the duration of a typical kiddie ride, i.e. within 60 seconds. The cabinet 4 also mounts a microprocessor-based controller 11 and contains a secure coin receiver (not shown) for the coin-release mechanism.

Any of a wide range of suitable controllers may be used. A particularly preferred controller is manufactured by the UK company Integrated Technology Limited and is designated the Sound Master Control Unit SMVS 2.01. This device has a high level of programmability and incorporates speech message circuitry and a wide range of hardware control outputs, including the necessary outputs to control a video camera and video printer.

Figure 3:
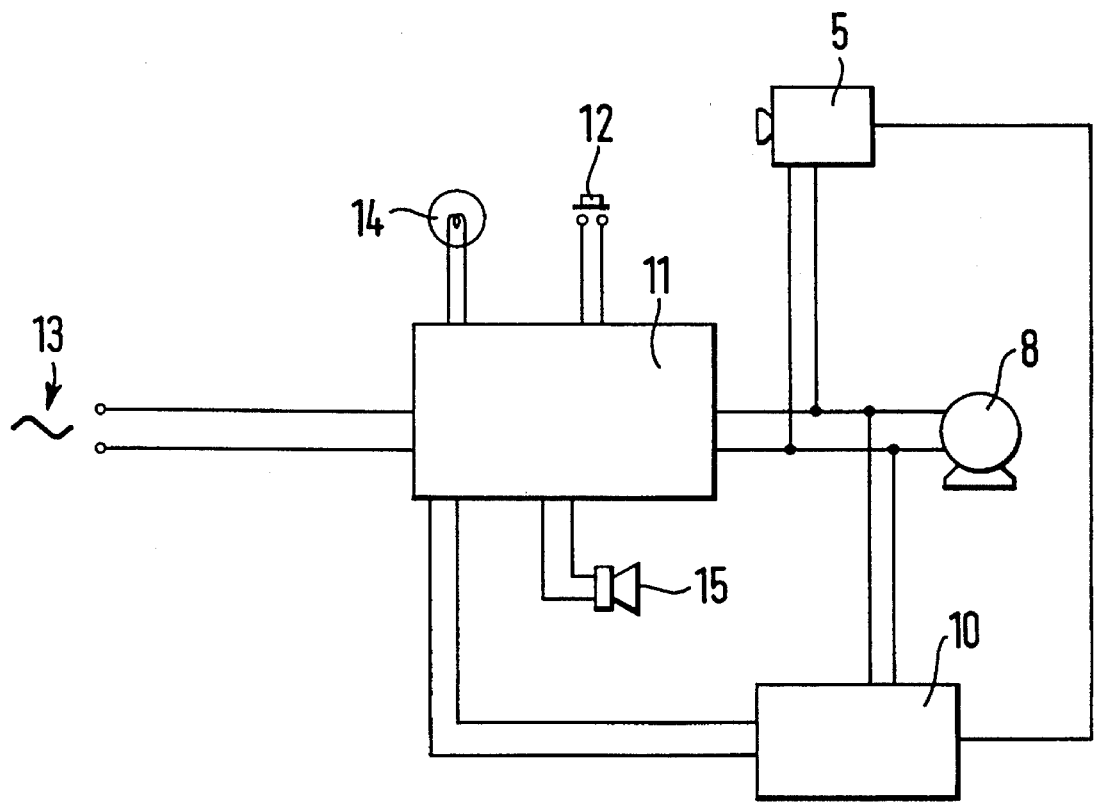
FIG. 3 is a diagram illustrating the operative components of the ride.

FIG. 3 illustrates the working relationship between the various components of the ride. The controller 11 is connected to an AC mains supply 13 (230 V 50 Hz in the UK), and provides a switched mains power output to the electric motor 8, the camera 5 and the printer 10, so that the latter two items can only operate when the motor is running. A control signal input from the coin-release mechanism 12 serves to initiate operation of the ride, and outputs are provided from the controller 11 to the printer 10, to a warning light 14 and to a loudspeaker 15.

Figure 4:
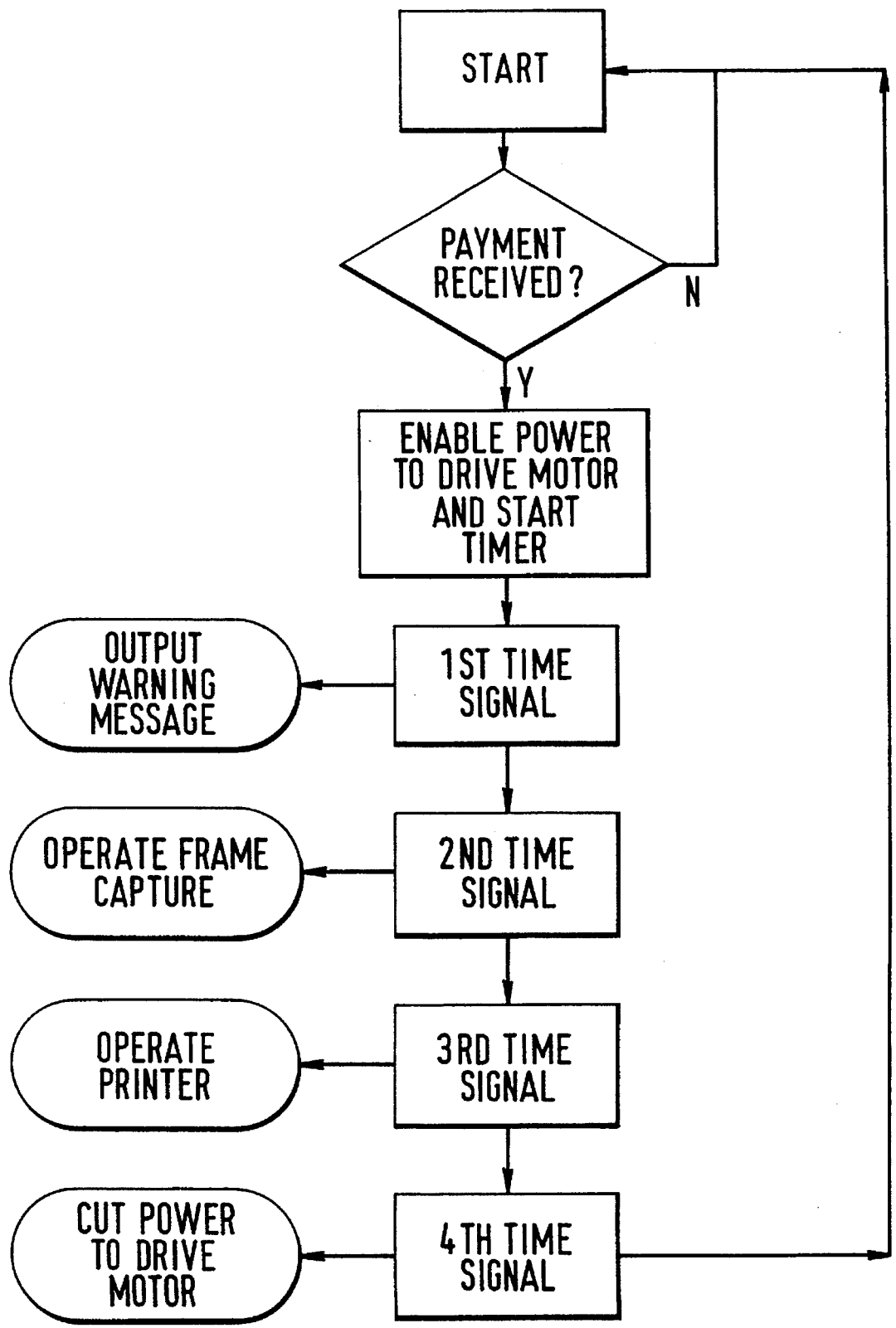
FIG. 4 is a flow chart illustrating the sequence of events in the operation of the ride.

The operation of the ride will now be described with reference also to the flow chart shown in FIG. 4. The illustrated ride incorporates a colour printer, but the operation of a ride having a monochrome printer is essentially very similar. The controller 11 repeatedly monitors the output from the coin-release mechanism. Upon receipt of a signal indicating that the correct payment has been made, the controller 11 switches mains power to the motor 8 and to the video camera 5 and printer 10. A timer within the controller is started. The timer is arranged to output time signals at predetermined intervals after the start of the ride's operation (i.e. from the switching of power to the motor 8). At the first time signal, the controller 11 switches on a lamp to illuminate a warning sign to indicate that the picture is about to be taken. The sign may carry words such as "Smile Please" or "Say Cheese" or the equivalent in the local language, or it may carry a symbol, for example of a camera. The sign may be illuminated continuously or intermittently (flashing) for a predetermined period. At the same time, speech generating circuitry within the Integrated Technology SMVS 2.01 controller outputs a speech warning to the loudspeaker 15, for example repeating the words mentioned above in relation to the warning sign.

After a suitable delay, the second time signal is output from the timer, and this in turn causes the controller to send a control signal to the video printer 10 to cause it to capture a video frame from the video camera 5. A third time signal then causes a second control signal to be sent by the controller to the video printer 10 to start the printing operation for the captured frame. The finished print is then delivered to the slot 6 after a standard processing time, as hereinafter described with reference to FIGS. 6 and 7.

The time signals are arranged such that the interval between the third time signal and the fourth time signal, which causes the controller to switch off the power to the motor 8, thus ending the ride operation, is sufficient to ensure that the photograph is delivered during or at the end of the ride's operation, or with only a very short delay after the movement ceases, so as to ensure maximum availability of the ride. It will be appreciated that the microprocessor in the controller can be programmed to ensure that the time signals are sent at the desired intervals.

Figure 5:
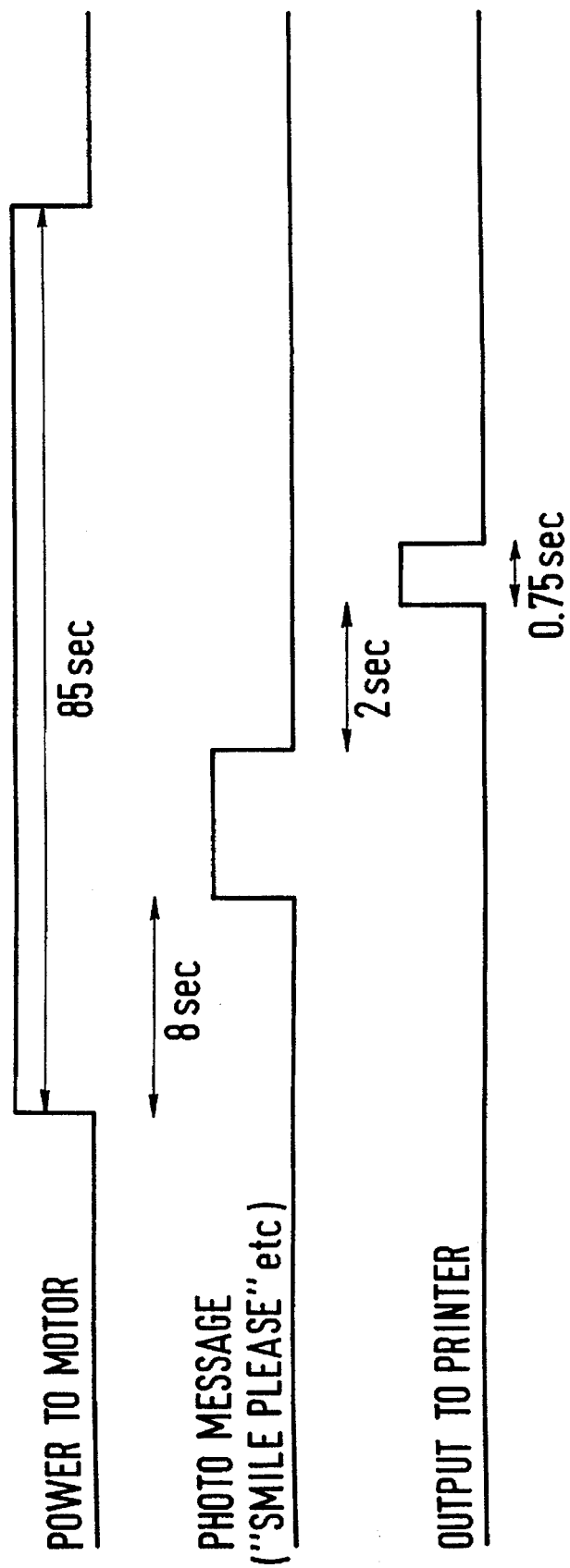
FIG. 5 is a timing chart for the operation of the ride.

Typically with a monochrome printer, and with some colour printers, only one control signal is required to cause the photographic print to be produced; the separate frame capture and print steps are combined. This is illustrated in FIG. 5, in which the times intervals are not to scale. It will be appreciated that the timings shown in FIG. 5 are merely examples; they can be varied without affecting the scope of the invention.

Figure 6:
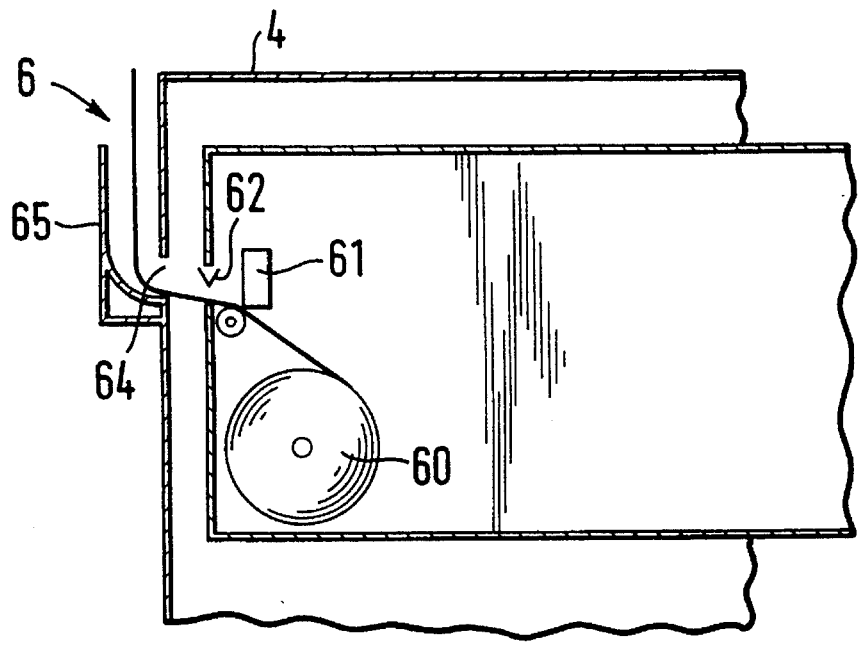
FIG. 6 is a diagrammatic sectional view of part of the ride showing the delivery of the photograph from a monochrome printer.

Referring to FIG. 6, the monochrome printer includes a roll 60 of thermally-sensitive paper which, during the printing operation is passed over a thermal printing head 61 to form the monochrome photographic image, the desired length of paper being cut off by a cutter 62 after emerging through an opening 64 in the cabinet 4 and being deflected upwardly by a deflector 65 to be delivered to the slot 6.

Figure 7:
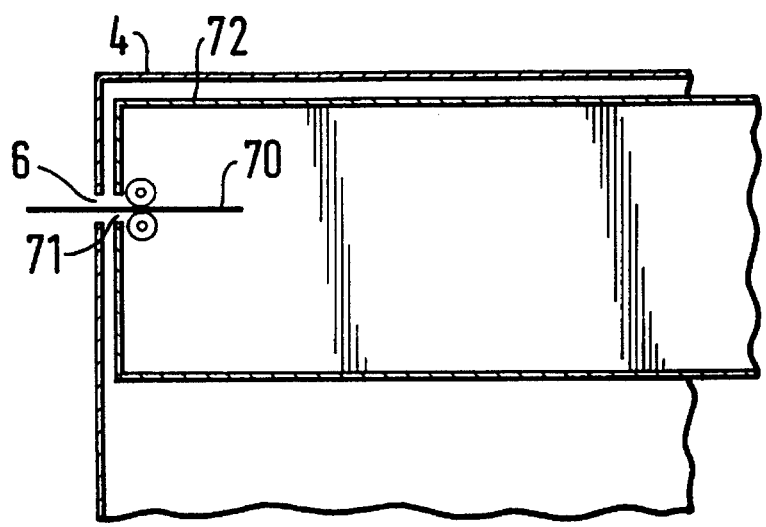
FIG. 7 is a diagrammatic sectional view of part of the ride showing the delivery of the photograph from a colour printer.

An alternative arrangement is used in the case of the colour printer, as illustrated in FIG. 7. Here, the dye-sublimation material is held in the printer in the form of individual sheets 70 which are delievred by the printer's drive mechanism through a slot 71 in the casing 72 of the printer, the slot 71 being aligned with the slot 6 in the cabinet 4.

Figure 8:
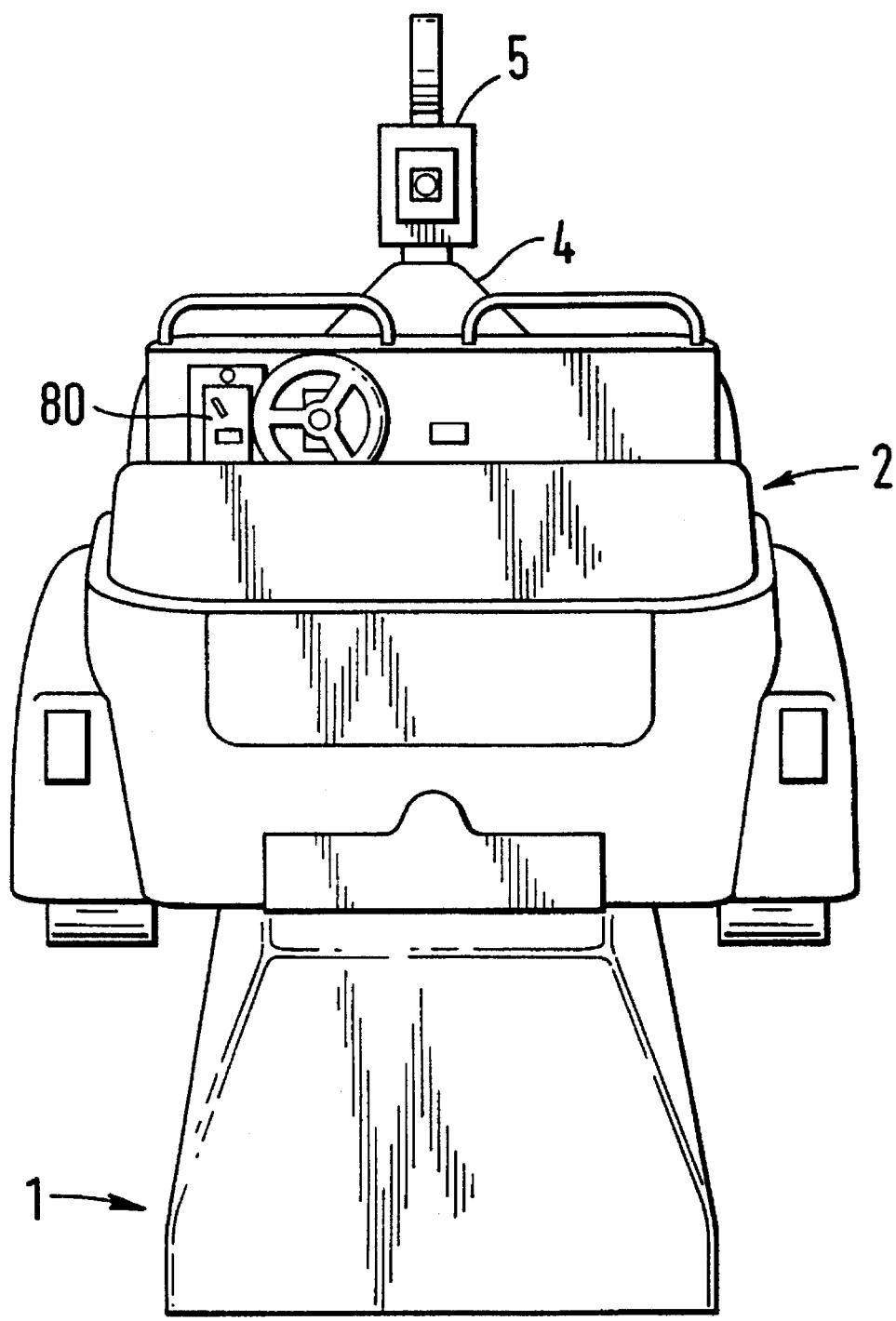
FIG. 8 is a view from the rear of the seat unit of the ride shown in FIG. 1, but showing an alternative location for the coin mechanism.

In an alternative arrangement, illustrated in FIG. 8, the coin-release mechanism 80 is mounted in the seat unit, so that the child can cause its operation by insertion of the coins itself. In this arrangement, the electronic coin-release mechanism used needs to be level when operated, and it is therefore important to ensure that the ride is stopped with the mechanism level. This is conventionally achieved by the provision of magnetic switches or the like which send out a signal when the ride passes a predetermined point, the power to the motor being cut at this point or within a predetermined interval afterwards. In order to ensure that the seat and its occupant are in the optimum position within the field of view and focus of the video camera, this signal may alternatively be used to trigger the operation of the frame capture step (or the printing step in the case of a monochrome printer), the controller being arranged to look for the signal from the magnetic switch after the second time signal is output, and to send the control signal to the printer at an interval after receipt of the magnetic switch signal such as to ensure that the seat unit and its occupant arrive at the optimum position at the same time as frame capture occurs.

FIG. 9 illustrates an alternative embodiment to that shown in FIG. 1, in which a second coin-release mechanism 6b is also provided to cause operation of the photographic means in response to receipt of a payment therein. The second coin-release mechanism can only be operated while the ride is operating.

I claim:

1. An amusement ride comprising a base including drive means and a seat mounted on the base and movable relative thereto by the drive means, first payment means for causing operation of the drive means in response to receipt of a payment, photographic means attached to the base and arranged to produce a photograph of the seat and any occupant thereof, and control means operatively connected to the drive means and to the photographic means to enable operation of the photographic means when the drive means is operating.

2. An amusement ride according to claim 1, wherein the control means comprises timing means to cause the photographic means to operate to produce a photograph after a predetermined period of operation of the drive means.

3. An amusement ride according to claim 2, comprising means for generating a warning signal at a predetermined time interval before operation of the photographic means.

4. An amusement ride according to claim 3, wherein the means for generating a warning signal comprises speech synthesis means for producing a speech message.

5. An amusement ride according to claim 1, comprising a second payment means associated with the photographic means and arranged to cause operation of the photographic means in response to receipt of a payment therein.

6. An amusement ride according to claim 5, wherein said second payment means comprises a coin- or token-release mechanism.

7. An amusement ride according to claim 5, wherein said second payment means comprises a note-acceptor mechanism.

8. An amusement ride according to claim 5, wherein said second payment means comprises a card-reading device for payment cards.

9. An amusement ride according to claim 1, wherein the photographic means comprises a video camera outputting a succession of video frames representing photographic images and printing means for capturing one of the frames and for producing a photographic print of the image represented by the frame.

10. An amusement ride according to claim 1, wherein the photographic means comprises a camera provided with photochemical imaging means operable to produce a photographic print during the operation of the drive means.

11. An amusement ride according to claim 1, wherein the photographic means comprises a camera provided with photochemical imaging means operable to produce a photographic print within a predetermined period following the end of operation of the drive means.

12. An amusement ride according to claim 1, wherein said first payment means comprises a coin- or token-release mechanism.

13. An amusement ride according to claim 1, wherein said first payment means comprises a note-acceptor mechanism.

14. An amusement ride according to claim 1, wherein said first payment means comprises a card-reading device for payment cards.

15. An amusement ride according to claim 1, wherein a driven arm extends from the drive means to support the seat, the arm being moved cyclically for a period of ride operation.

16. An amusement ride according to claim 1, wherein a plurality of driven arms extend from the drive means to support the seat, the arms being moved cyclically for a period of ride operation.

17. An amusement ride according to claim 1, wherein means are provided for sending out a signal to the control means when the ride passes a predetermined point, and wherein the control means is arranged to enable operation of the photographic means at a predetermined interval after receipt thereby of said signal.

* * * * *